(12) United States Patent
Debard et al.

(10) Patent No.: US 6,794,838 B2
(45) Date of Patent: Sep. 21, 2004

(54) METHOD AND SYSTEM FOR REGULATING THE POWER DEMANDED BY A RAIL MOTOR

(75) Inventors: Jean-Michel Debard, Le Garon (FR); Rong-Fan Liu, Rabelais (FR)

(73) Assignee: Alstom, Paris (FR)

( * ) Notice: Subject to any disclaimer, the term of this patent is extended or adjusted under 35 U.S.C. 154(b) by 0 days.

(21) Appl. No.: 10/405,644

(22) Filed: Apr. 3, 2003

(65) Prior Publication Data

US 2003/0197493 A1 Oct. 23, 2003

(30) Foreign Application Priority Data

Apr. 19, 2002 (FR) ............................................. 02 04933

(51) Int. Cl.[7] .............................................. H02K 17/32
(52) U.S. Cl. ..................... 318/434; 318/811; 318/52; 318/806; 318/808; 318/432; 318/433
(58) Field of Search ................................ 318/434, 811, 318/52, 806, 808, 798; 363/41, 98; 388/811

(56) References Cited

U.S. PATENT DOCUMENTS

| | | | |
|---|---|---|---|
| 4,145,618 A | * | 3/1979 | Restori et al. ................. 307/64 |
| 4,327,313 A | * | 4/1982 | Tsuboi et al. ................. 318/52 |
| 5,587,891 A | * | 12/1996 | Nakata et al. ................. 363/41 |

FOREIGN PATENT DOCUMENTS

| | | |
|---|---|---|
| JP | 10 210606 A | 8/1998 |
| JP | 2000 116189 A | 4/2000 |
| JP | 2001 269403 A | 6/2001 |
| WO | WO 01 47742 A | 7/2001 |

* cited by examiner

*Primary Examiner*—Karen Masih
(74) *Attorney, Agent, or Firm*—Sughrue Mion, PLLC

(57) ABSTRACT

A method of regulating the power demanded by a rail motor including a current collector system cooperating with a catenary supplied with direct current power by power supply substations distributed along the track includes the steps of: measuring the catenary voltage Vcat at the rail motor, measuring the catenary current Icat at the rail motor, evaluating the no-load voltage $Vcat_0$ of the substation supplying power to the catenary to which the rail motor is connected, evaluating the maximum power available to the catenary from the equation:

$$P\max = \frac{(Vcat_0)^2}{4*R}$$

where R is the resistance of the catenary, and limiting the power demanded by the rail motor to a power limit Plim less than or equal to the calculated maximum power Pmax.

8 Claims, 2 Drawing Sheets

METHOD AND SYSTEM FOR REGULATING THE POWER DEMANDED BY A RAIL MOTOR

BACKGROUND OF THE INVENTION

1. Field of the Invention

The invention relates to a method for regulating the power of a rail motor supplied with power via a direct current catenary. It relates more particularly to a method of regulating the power demanded by the rail motor as a function of the power available to the catenary. The invention also relates to a system for implementing the method.

2. Description of the Prior Art

Direct current power is usually supplied to a rail motor by means of a catenary supplied with power by substations arranged along the railroad track. The substations are rated to supply a particular power and if the power absorbed by a rail motor is greater than the power available to the catenary, either because a plurality of railroad vehicles are on a portion of track supplied with power by the substation at the same time, or because the catenary is not supplied with power correctly because of engineering works or a long distance between substations, voltage drops occur at the power supply substations that can cause a circuit-breaker to trip out in response to an overload or a circuit-breaker in the rail motor to trip out because the voltage is too low.

Solving this problem by placing on board the rail motor a manual selector for limiting the power of the rail motor, which the driver must set to a position defined in the driver's manual, is known in the art. However, this kind of system is based on nominal operating conditions and does not automatically adapt the power demanded by the rail motor to variations in operating conditions. Accordingly, this kind of system governs the power of the rail motor in a manner that takes account of the worst case scenario operating conditions and cannot benefit from areas supplied with more power, for example near the substations, where the rail motor can consume more power.

Another prior art solution determines the maximum power that the rail motor can consume by measuring the catenary voltage. This solution is generally effective if the rail motor is not too far from the substation. However, if it is at a great distance from the substation, the resistance of the catenary becomes high and the line voltage then depends very considerably on the current flowing in the catenary and thus on the power absorbed by the rail motor. In a situation of this kind, a small increase in consumption implies a large catenary voltage drop and, the action of the power limiting algorithm being a function of the catenary voltage, the gain of the regulation system becomes higher and higher, resulting in an unstable power regulation system.

The object of the present invention is therefore to propose a stable method and system for regulating the power of a rail motor that ensure optimum operation of the rail motor as a function of the power available to the catenary.

SUMMARY OF THE INVENTION

The invention provides a method of regulating the power demanded by a rail motor including current collector means cooperating with a catenary supplied with direct current power by power supply substations distributed along the track, which method includes the steps of:

measuring the catenary voltage Vcat at the rail motor;
measuring the catenary current Icat at the rail motor;
evaluating the no-load voltage $Vcat_0$ of the substation supplying power to the catenary to which the rail motor is connected;
evaluating the maximum power available to the catenary from the equation:

$$P\max = \frac{(Vcat_0)^2}{4*R}$$

where R is the resistance of the catenary calculated from the equation:

$$R = \frac{(Vcat_0 - Vcat)}{Icat};$$

and limiting the power demanded by the rail motor to a power limit Plim less than or equal to the calculated maximum power Pmax.

According to another feature of the invention the no-load voltage $Vcat_0$ of the substation is evaluated by correcting the value of the theoretical no-load voltage $Vcat_0'$ of the substation by means of a proportional-integral regulator whose input is the difference R'-R, where R' is the dynamic resistance of the catenary.

According to another feature of the invention the power limit Plim is calculated by applying to the calculated power Pmax a reducing coefficient K from 0 to 1 taking account of limitations imposed by the infrastructures.

The invention also provides a system for regulating the power demanded by a rail motor including current collector means cooperating with a catenary supplied with direct current power by power supply substations distributed along the track, which system includes:

means for measuring the catenary voltage Vcat at the rail motor;

means for measuring the catenary current Icat at the rail motor;

a stage for evaluating the no-load voltage $Vcat_0$ of the substation supplying power to the catenary to which the rail motor is connected;

a stage for evaluating the maximum power Pmax available to the catenary including a module for calculating the equivalent resistance $$R = \frac{(Vcat_0 - Vcat)}{Icat}$$

and a module for calculating the power $$P\max = \frac{(Vcat_0)^2}{4*R};$$

and means for limiting the power demanded by the rail motor to a value less than or equal to the calculated maximum power Pmax.

Particular embodiments of the power regulation system according to the invention can have one or more of the following features alone or in any technically feasible combination:

the stage for evaluating the substation voltage $Vcat_0$ includes at least one memory delivering a signal $Vcat_0'$ corresponding to the theoretical no-load voltage of the substation supplying power to the rail motor, said signal $Vcat_0'$ serving as a basic value for evaluating the substation voltage $Vcat_0$.

the stage for evaluating the substation voltage $Vcat_0$ further includes means for producing a correction signal that is injected into the theoretical no-load signal $Vcat_0'$ and is produced by a proportional-integral regulator which receives as input the difference R'–R, where R' is the dynamic resistance of the catenary.

the maximum power Pmax is corrected by a multiplier coefficient K obtained from a reducer module taking account of limitations imposed by the infrastructure.

the means for measuring the catenary voltage Vcat and the catenary current Icat are sensors carried by the current collector means.

The subject matter, aspects and advantages of the present invention will be better understood from the following description of one embodiment of the invention, which is described by way of nonlimiting example and with reference to the accompanying drawings.

DETAILED DESCRIPTION OF THE PREFERRED EMBODIMENT

Figure 1:
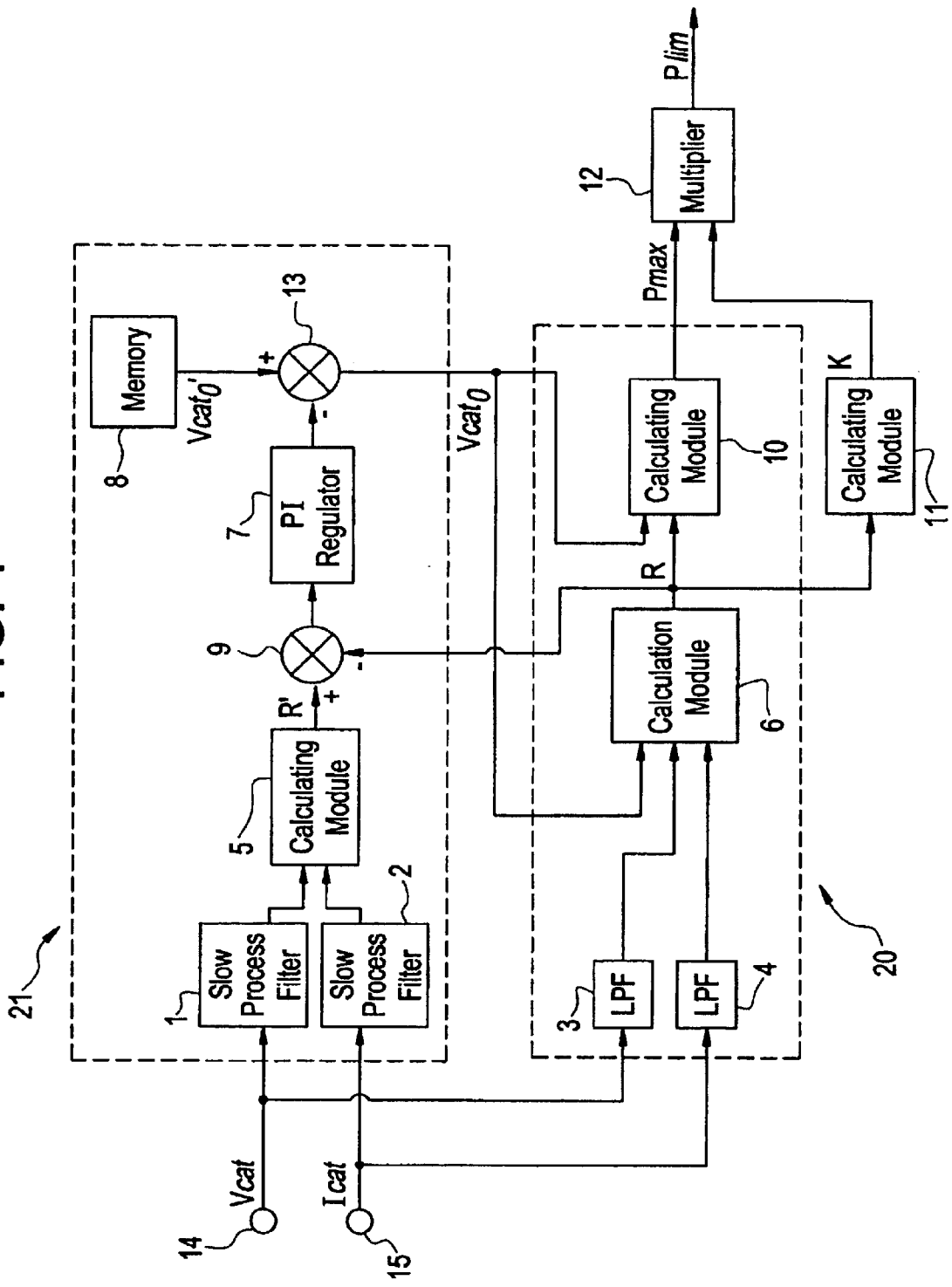
FIG. 1 is a block diagram showing the structure of a power regulator according to the invention.

To make the drawing easier to read, only elements necessary to understanding the invention have been shown.

FIG. 1 shows the general structure of a system for regulating the power of a rail motor conforming to one particular embodiment of the invention.

As shown in this figure, the system includes a stage 20 for evaluating the maximum power Pmax available to the catenary and operating in parallel with a stage 21 for evaluating the no-load voltage $Vcat_0$ of the substation supplying power to the catenary to which the railroad vehicle is connected.

The stage 20 for evaluating the maximum power includes a module 6 for calculating the resistance R of the catenary and a module 10 for evaluating the maximum power Pmax available to the catenary.

The module 6 receives as input measurement signals for the catenary voltage Vcat and the catenary current Icat from respective sensors 14 and 15 on the pantograph of the rail motor and the value $Vcat_0$ obtained by the stage 21 for evaluating the no-load voltage of the substation. In FIG. 1, the signals Vcat and Icat are filtered by low-pass filters 3 and 4 before they are fed to the calculation module 6.

From the inputs Icat, Vcat and $Vcat_0$, the module 6 calculates the catenary resistance from the equation:

$$R = \frac{(Vcat_0 - Vcat)}{Icat}$$

Figure 2:
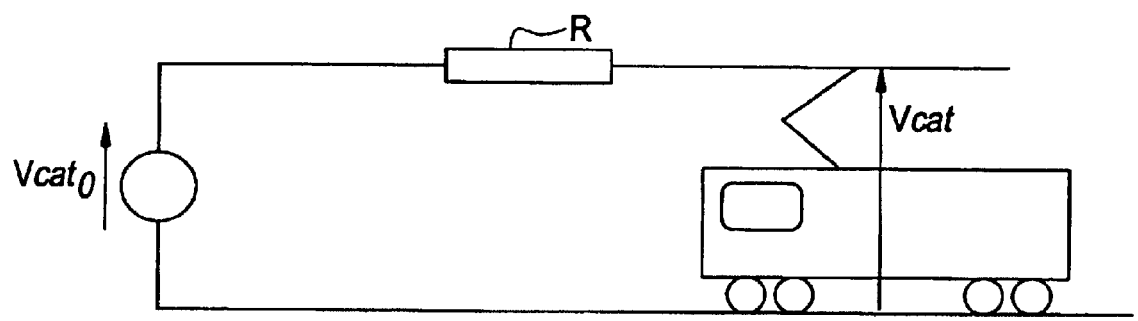
FIG. 2 is a diagrammatic representation of a power electrical circuit of a substation supplying power to a rail motor.

The above equation can be deduced easily from FIG. 2, representing a power electrical schematic showing the supply of power to the rail motor when the latter is connected to a catenary. In FIG. 2, the power supply substation that supplies power to the catenary is symbolized by a generator supplying the voltage $Vcat_0$ and the resistance of the portion of catenary between the substation and the rail motor is symbolized by a resistor R.

The output R of the module 6 is fed to the input of the module 10 which also receives as input the value $Vcat_0$ obtained at the output of the stage 21 for evaluating the no-load voltage of the substation. From this data the module 10 calculates the maximum power available to the catenary using the equation:

$$Pmax = \frac{(Vcat_0)^2}{4*R}.$$

The above equation can be deduced from the following equations, established with reference to FIG. 2:

$Vcat = Vcat_0 - R*Icat$ and $P = Vcat*Icat$ i.e. $P = (Vcat_0*Icat) - R*(Icat)^2$ whence $$\frac{\partial P}{\partial Icat} = Vcat_0 - 2*R*Icat$$

and $$\frac{\partial P}{\partial Icat} = 0 \Rightarrow Icat_{max} = \frac{Vcat_0}{2*R} \Rightarrow Pmax \frac{(Vcat_0)^2}{4*R}$$

The output of the module 10 is then fed to the input of a multiplier 12 which also receives the value of a reducing coefficient K (0<K<1) from a module 11 for taking into account limitations imposed by the infrastructures. The coefficient K depends on the network on which the rail motor circulates, is supplied by a database contained in the module 11, and is a function of the value of the resistance R of the catenary calculated by the module 6.

The output of the multiplier circuit 12 supplies a power limit Plim corresponding to the maximum power that can be demanded at any given time by all of the electrical power consuming equipment units of the rail motor with no risk of a decrease in the catenary voltage. This value Plim is then sent to means, not shown, for limiting the power demanded by the rail motor so that it does not exceed Plim.

The operation of the stage 21 for evaluating the no-load voltage $Vcat_0$ of the substation is described next with reference to FIG. 1.

The stage 21 includes a module 5 for calculating the dynamic resistance R' of the catenary. The module 5 receives as input the measurement signals for the voltage Vcat and the current Icat supplied by the sensors 14 and 15 and filtered by slow processing filters 1 and 2 so as to retain only the primitive signals sent by the measurement sensors. At time intervals Δt, the module 5 stores the values Vcat and Icat and calculates the successive values of the dynamic resistance R' from the equation:

$$R' = \frac{\Delta Vcat}{\Delta Icat} = \frac{Vcat(t + \Delta t) - Vcat(t)}{Icat(t + \Delta t) - Icat(t)}$$

The dynamic resistance R' corresponds to the sum of the resistance of the catenary, the resistance of the substation, and an imaginary resistance corresponding to the voltage drop caused by the consumption of rail motors connected to the same substation if a plurality of rail motors are circulating on the same line.

The calculated value R' is then fed to the input of a subtractor 9 which subtracts from it the resistance R calculated on the preceding iteration by the module 6 of the stage 20 previously described. The output of the subtractor 9 is fed to the input of a proportional-integral regulator 7 which has a limited output value. The output signal from the regulator 7 provides a correction signal that is fed to a subtractor 13 which subtracts it from a signal $Vcat_0'$ corresponding to the theoretical no-load supply voltage of the substation, which is provided by a memory 8. The output of the subtractor 13 corresponds to a corrected signal $Vcat_0$ which is sent to the modules 6 and 10 of the stage 20 for evaluating the maximum power available to the catenary. To begin the calculation process, the value $Vcat_0$ supplied by the stage 21 to the stage 20 in the first iteration of the calculation is advantageously equal to the theoretical value $Vcat_0'$ of the no-load voltage of the substation.

This kind of evaluation stage 21 has the advantage of taking into account voltage drops at the substation caused by exceeding the power demanded by the rail motor relative to the power actually available to the catenary.

Following several iterations of calculation by the stages 20 and 21, this regulator produces the instantaneous maximum power available to the catenary and thus, taking account of a reducing coefficient corresponding to the limitations imposed by the infrastructures, the power limit Plim that can be demanded at any time by a rail motor traveling on the line supplied with power by the substation.

Consequently, the regulator according to the invention can determine the maximum power set point that the rail motor must not exceed and which must be divided between all of the electricity consuming equipment units on board the rail motor, such as traction motors, train heating and ancillary equipment.

Of course, the invention is in no way limited to the embodiment described and shown by way of example only. Without departing from the scope of the protection of the invention, the embodiment described and shown can be modified, in particular from the point of view of the composition of the various component parts or by substituting technical equivalents.

There is claimed:

1. A method of regulating the power demanded by a rail motor including current collector means cooperating with a catenary supplied with direct current power by power supply substations distributed along a track, which method includes the steps of:

measuring a catenary voltage Vcat at said rail motor;

measuring a catenary current Icat at said rail motor;

evaluating a no-load voltage $Vcat_0$ of the substation supplying power to the catenary to which the rail motor is connected;

evaluating the maximum power available to said catenary from the equation:

$$P\max = \frac{(Vcat_0)^2}{4*R}$$

where R is the resistance of said catenary calculated from the equation:

$$R = \frac{(Vcat_0 - Vcat)}{Icat};$$

and limiting the power demanded by said rail motor to a power limit Plim less than or equal to the calculated maximum power Pmax.

2. The method claimed in claim 1 for regulating the power demanded by a rail motor, wherein said no-load voltage $Vcat_0$ of said substation is evaluated by correcting the value of the theoretical no-load voltage $Vcat_0'$ of said substation by means of a proportional-integral regulator whose input is the difference R'−R, where R' is the dynamic resistance of said catenary.

3. The power regulation method claimed in claim 1, wherein said power limit Plim is calculated by applying to said calculated power Pmax a reducing coefficient K from 0 to 1 taking account of limitations imposed by infrastructures.

4. A system for regulating the power demanded by a rail motor including current collector means cooperating with a catenary supplied with direct current power by power supply substations distributed along the track, which system includes:

means for measuring a catenary voltage Vcat at said rail motor;

means for measuring a catenary current Icat at said rail motor;

a stage for evaluating a no-load voltage $Vcat_0$ of the substation supplying power to the catenary to which said rail motor is connected;

a stage for evaluating the maximum power Pmax available to said catenary including a module for calculating the equivalent resistance $$R = \frac{(Vcat_0 - Vcat)}{Icat}$$

and a module for calculating the power $$P\max = \frac{(Vcat_0)}{4*R};$$

and means for limiting the power demanded by said rail motor to a value less than or equal to the calculated maximum power Pmax.

5. The system claimed in claim 4, wherein said stage for evaluating the substation voltage $Vcat_0$ includes at least one memory delivering a signal $Vcat_0'$ corresponding to the theoretical no-load voltage of the substation supplying power to said rail motor, said signal $Vcat_0'$ serving as a basic value for evaluating said substation voltage $Vcat_0$.

6. The system claimed in claim 4, wherein said stage for evaluating said substation voltage $Vcat_0$ further includes means for producing a correction signal that is injected into said theoretical no-load signal $Vcat_0'$ and is produced by a proportional-integral regulator which receives as input the difference R'−R, where R' is the dynamic resistance of said catenary.

7. The system claimed in claim 4, wherein said maximum power Pmax is corrected by a multiplier coefficient K obtained from a reducer module taking account of limitations imposed by infrastructure.

8. The system claimed in claim 4, wherein said means for measuring said catenary voltage Vcat and said catenary current Icat are sensors carried by said current collector means.

* * * * *